United States Patent [19]

Iida et al.

[11] Patent Number: 4,637,494

[45] Date of Patent: Jan. 20, 1987

[54] APPARATUS FOR MOVING CARRIAGES ALONG LADDERS

[75] Inventors: Hitoshi Iida; Ryoichi Nakayama, both of Kawasaki, Japan

[73] Assignee: Kabushiki Kaisha Toshiba, Kanagawa, Japan

[21] Appl. No.: 671,419

[22] Filed: Nov. 14, 1984

[30] Foreign Application Priority Data

Nov. 15, 1983 [JP]  Japan ................... 58-213390
Nov. 30, 1983 [JP]  Japan ................... 58-225969

[51] Int. Cl.$^4$ .......................... B66B 9/20; E04G 3/14
[52] U.S. Cl. ................................. 187/10; 182/136;
      182/102; 414/750; 901/1; 901/47; 901/50
[58] Field of Search ................. 187/10; 182/136, 102;
      414/736, 750, 8, 11; 901/1, 50, 47; 165/76, 11
      A; 294/906

[56] References Cited

U.S. PATENT DOCUMENTS 3,504,767  4/1970  Sherman .................... 182/136
3,913,752  10/1975  Ward et al. ............... 414/750
3,945,514  3/1976  Dose ........................ 294/906 X
4,018,345  4/1977  Formanek et al. ......... 165/11 A
4,449,599  5/1984  Creek ....................... 414/750 X
4,496,277  1/1985  Jungman .................... 414/11 X

FOREIGN PATENT DOCUMENTS 0045174  2/1982  European Pat. Off. ........... 901/47
2529131  12/1983  France ........................... 901/50
0704775  12/1979  U.S.S.R. ........................ 901/47

OTHER PUBLICATIONS

"Inspection of Nuclear Power Generating Plant During Use With a Movable Robot", Nikkei Mechanical 1981, 6.22, published by Nikkei.

Primary Examiner—F. J. Bartuska
Assistant Examiner—Gregory L. Huson
Attorney, Agent, or Firm—Schwartz, Jeffery, Schwaab, Mack, Blumenthal & Evans

[57] ABSTRACT

A carriage carrying a robot, a television camera, etc. is moved along a ladder having spaced ledges. The carriage has a number of gripper units moved in the direction of movement of the carriage by air cylinders or motor driven threaded rods. Each gripper unit is reciprocated toward and away from the ladder and provided with a motive device for opening and closing grippers for gripping or releasing the ledges.

14 Claims, 21 Drawing Figures

FIG.13
FIG.14
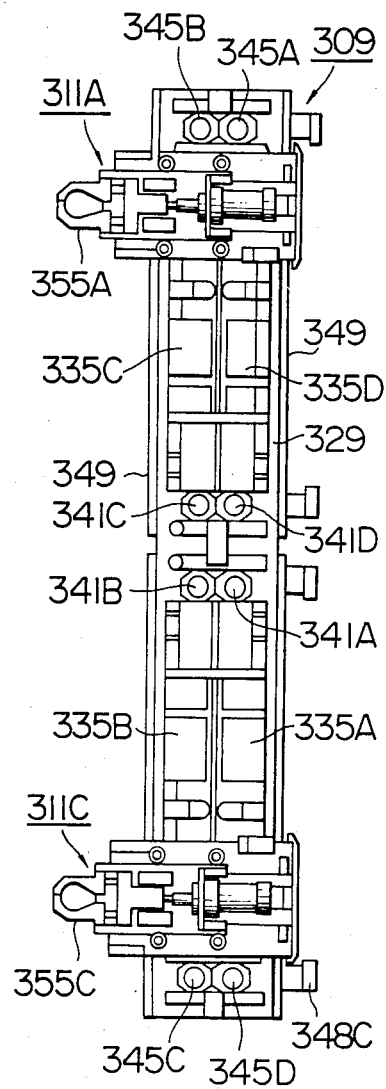
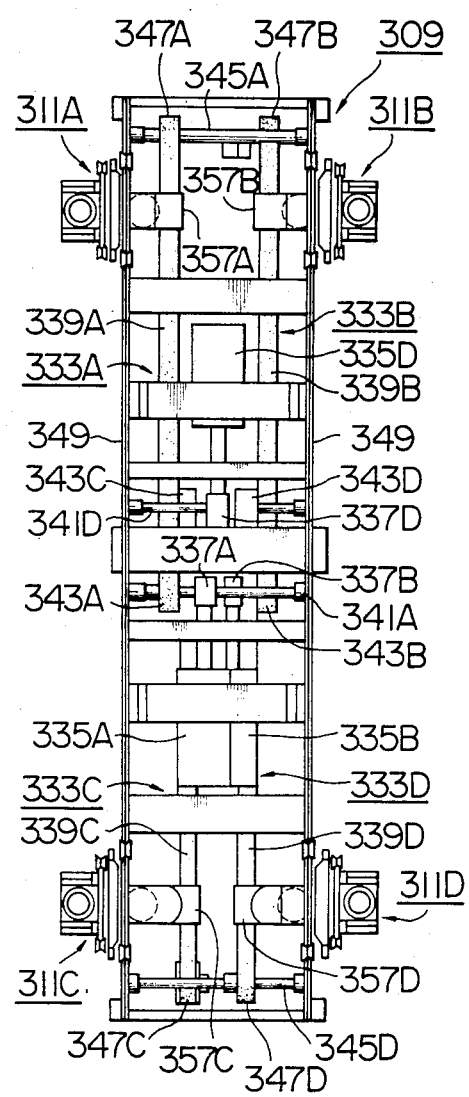

APPARATUS FOR MOVING CARRIAGES ALONG LADDERS

BACKGROUND OF THE INVENTION

This invention relates to apparatus for moving a carriage along a ladder.

At present, an apparatus for automatically climbing up and down stairs is used a crawler, but as far as we are aware no apparatus has been developed that can automatically climb up and down a ladder or a like structure.

In a nuclear power plant, for the purpose of decreasing the danger of an operator from being exposed to radioactive rays, maintenance and inspection of the plant are made by a remotely controlled robot. In a nuclear power plant, there are many vertical or inclined ladders but presently used robots cannot climb up and down the ladders so that it is impossible to inspect or repair machines and apparatus installed at such positions in the plant unless the robot climbs up or down the ladders. For this reason, inspection and repair of the machines and apparatus installed at such dangerous positions must be made by the operator.

In order to enable a main body or carriage carrying a television camera, a robot, inspecting or repairing apparatus or the like to move along a ladder, it is necessary to provide for the carriage gripping means corresponding to hands and feet of a human being which are alternately operated to grip the ledges of the ladder.

SUMMARY OF THE INVENTION

It is an object of this invention to provide apparatus for moving along a ladder a carriage carrying a robot, television camera, measuring apparatus or the like to a position which an operator cannot see directly.

A more specific object of this invention is to provide an apparatus for carrying a carriage to a position where danger of exposure of radioactive rays is great, so that the apparatus is especially suitable for use in a nuclear power plant.

According to this invention there is provided apparatus for moving a carriage along a ladder comprising drive means for moving the carriage along the ladder in one or other direction, a plurality of gripper units carried by the carriage, each gripper unit including grippers for gripping a ledge of a ladder, and means carried by the carriage for reciprocating the gripper units toward and away from the ladder, each gripper unit including motive means for opening and closing the grippers for causing the same to grip or release the ledge.

BRIEF DESCRIPTION OF THE DRAWINGS

In the accompanying drawings:

FIG. 13 is a side view of the carriage shown in FIG. 12;

FIG. 14 is a plan view of the carriage;

DESCRIPTION OF THE PREFERRED EMBODIMENTS

Figure 1:
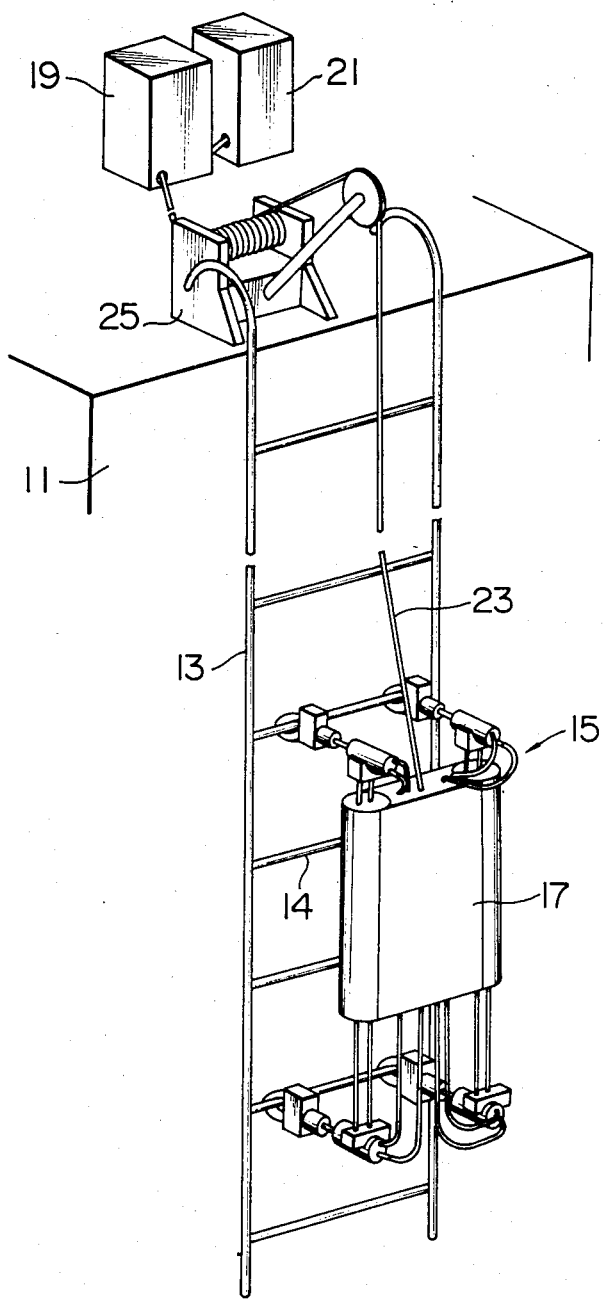
FIG. 1 is a vertical perspective view showing a ladder and one example of the apparatus for moving a carriage along the ladder.
Figure 2:
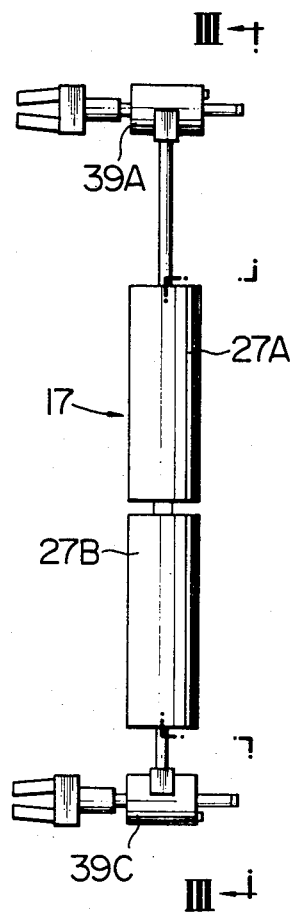
FIG. 2 is a side view of the carriage, shown in FIG. 3.

In a preferred embodiment of this invention shown in FIG. 1, a ladder 13 is secured to a vertical wall 11. The ladder is not always installed vertically and, in certain cases, obliquely or horizontally. Apparatus 15 for climbing up and down the ladder comprises a carriage or a main body 17, a source of pressurized air 19 and control computer 21 which are mounted above the vertical wall 11. The source 19 acts as a drive source for the carriage 17, and includes an air compressor and electromagnetic valves, not shown. The compressor is connected to a plurality of cylinders provided for the carriage 17 via air pipes for supplying compressed air to these cylinders. Air pipes are assembled as a bundle 23 which is payed out or wrapped about a drum of a winding device 25 mounted above the vertical wall 11 as the carriage is raised or lowered. The compressed air supplied to the cylinders from the source 19 is controlled by the electromagnetic valves which are actuated by the control computer 21.

Figure 3:
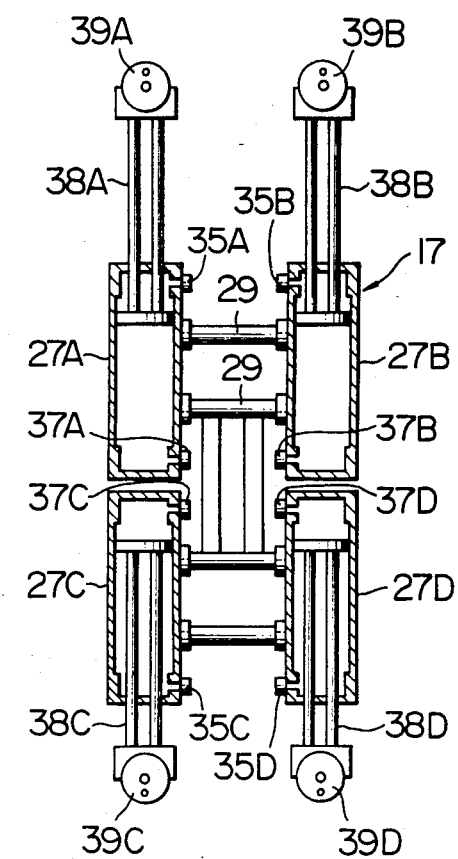
FIG. 3 is a sectional view taken along a line III—III in FIG. 2.
Figure 4:
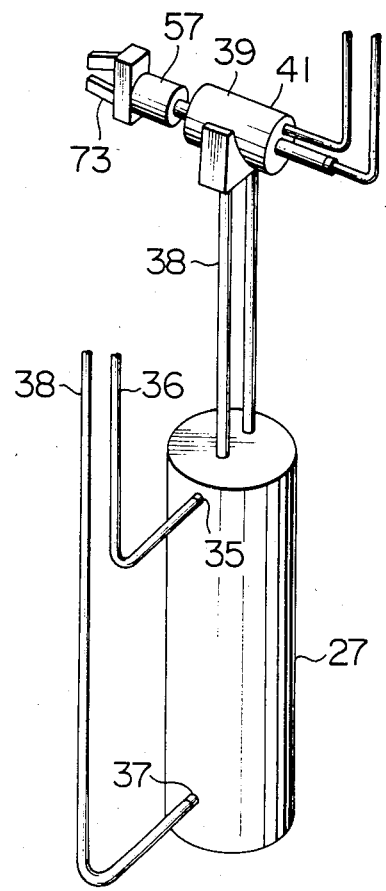
FIG. 4 is a perspective view showing a piston-cylinder assembly for raising and lowering the carriage.

The carriage 17 comprises four raising and lowering cylinders 27A, 27B, 27C and 27D (one of which is shown as 27 in FIG. 4). As shown in FIG. 3, these cylinders are combined into a unitary structure by connecting members 29. Of these four cylinders, cylinders 27A and 27B are disposed on one side of the carriage 17, whereas cylinders 27C and 27D are disposed on the other side.

Near opposite ends of respective cylinders 27A–27D are provided air inlet/outlet ports 35A –35D and 37A–37D. In FIG. 4 they are designated by 35 and 37, and connected to the source of compressed air 19 via air pipes 36 and 38, respectively.

The piston rods 38A–38D of the cylinders 27A–27D project to the outside of the carriage and are moved upwardly and downwardly by supplying and discharging compressed air into and out of the cylinders through inlet/outlet ports 37A –37D. The strokes of the piston rods 38A –38D are set to be substantially equal to the pitch or spacing between adjacent ledges 14 of the ladder 13. Each piston rod comprises two parallel rods acting to guide the reciprocating motion of the piston rod. Furthermore, the two rods prevent rotation of the piston rods 38A-38D about center axes of respective cylinders. Gripper units 39A-39D for gripping the ledges 14 of the ladder 13 are secured to the outer ends of the piston rods 38A-38D, respectively.

Figure 5:
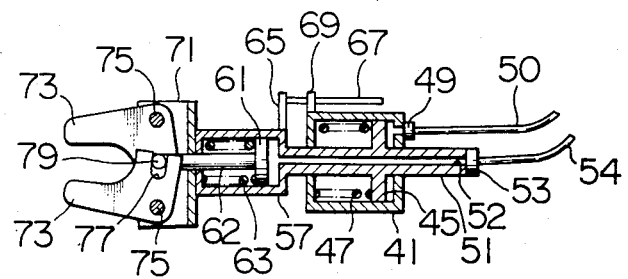
FIG. 5 is a sectional view of a gripper unit and its drive cylinders utilized in the apparatus shown in FIGS. 1, 2 and 3.

As shown in FIGS. 4 and 5, each gripper unit comprises, as its principal elements, an air cylinder 41 for reciprocating the grippers and an air cylinder 57 for opening and closing a pair of grippers 73.

The air cylinders 41 for reciprocating the gripper units are secured to the upper ends of the piston rods 38A-38D, respectively. Each air cylinder 41 slidably contains a piston 45 which is biased to the rear side by a compression spring 47 interposed between the piston 45 and the inner surface of the front wall of the cylinder 41. The rear wall of the cylinder 41 is provided with an air inlet/outlet port 49 which is connected to the source of compressed air through an air pipe 50 so that when compressed air is admitted into the cylinder 41, the piston 45 is moved forwardly against the force of spring 47. A piston rod 51 extending to the front and rear sides is secured to the piston 45, the piston rod and the piston being formed with an axial air passage 52. The front side of the piston rod 51 extends through the front wall of the cylinder 41, while the rear side thereof extends through the rear wall of the cylinder 41, whereby the linear reciprocating motion of the piston rod 51 is guided.

An inlet/outlet port 53 communicated with the air passage 52 is provided for the rear end of the piston rod 51. The inlet/outlet port 53 is connected with the source of compressed air 19 for admitting compressed air into the air passage 52.

The rear end of the cylinder 57 for opening and closing the grippers 73 is secured to the front end of the piston rod 51 so as to open the air passage 52 in the cylinder 57.

A piston 61 is slidably contained in the cylinder 57 and a compression spring 63 is interposed between the piston 61 and the front wall of the cylinder 57 so as to normally bias the piston 61 and piston rod 62 to the rear side. When compressed air is supplied into cylinder 57, piston 61 and piston rod 62 are moved forwardly against the force of the spring 63.

A guide rod 67 is secured to the rear side of the cylinder 57 through a mounting member 65. The guide rod 67 extends along the side surface of the cylinder 41 and is slidably fit in a guide plate 69 secured to the front end of the cylinder 41. The reciprocating motion of the cylinder 57 for opening and closing the grippers is guided by the guide rod 67 and the guide plate 69 which also prevent rotation about the direction of reciprocation.

A U-shaped cover 71 is secured to the front end of the cylinder 57, and a pair of grippers 73 are disposed in the cover 71. Each gripper 73 has an L-shaped configuration and its bent portion is rotatably pivoted to the cover 71 through a pin 75. Accordingly, when assembled, the pair of grippers 73 form an opening for receiving and gripping a ledge 14. A slot 77 is provided for the lower leg of each gripper 73. A pin 79 is secured to the front end of the piston rod 62 which is received in the slots 77. As the piston rod 62 is moved forwardly, the grippers 73 are opened by pin 79 whereas when the piston rod 62 is moved rearwardly, the grippers 73 are closed to grip a ledge 14 of the ladder 13.

As above described, the air cylinders 27A-27D for raising and lowering, air cylinder 41 for reciprocating the gripper unit and the air cylinder 57 for opening and closing the grippers 73 are controlled by the electromagnetic valves controlled by the control computer 21.

The four electromagnetic valves for controlling the raising and lowering cylinders 27A-27D are controlled such that the inlet/outlet ports 35A-35D of the four cylinders 27A-27D are connected to the air inlet side, whereas the inlet/outlet ports 37A-37D are connected to the air discharge side for moving the carriage 17. Then the electromagnetic valves are operated such that compressed air is introduced into the inlet/outlet port 37 of one of two raising and lowering cylinders positioned in the direction of movement of the carriage 17. After that, the electromagnetic valve connected to the remaining raising and lowering cylinder is positioned in the direction of movement of the carriage 17 so as to introduce compressed air into the inlet/ outlet port 37 of the last raising and lowering cylinder.

All of the 4 electromagnetic valves are operated such that the air inlet side and the air discharge side of the inlet/outlet ports 35A-35D and 37A-37D of the four raising and lowering cylinders 27A-27D are interchanged, thereby to move the carriage 17. Then an electromagnetic valve is operated to introduce compressed air into the inlet/outlet port 35 of one of two raising and lowering cylinders positioned on the side opposite to the direction of movement of the carriage 17. After that, an electromagnetic valve connected to the remaining one of the raising and lowering cylinders positioned on the side opposite to the direction of movement of the carriage 17 is operated to admit compressed air into the inlet/outlet port of that cylinder.

To actuate the gripper unit reciprocating cylinder 41 and the gripper opening and closing cylinder 57, an electromagnetic valve connected to the cylinder 41 is operated for admitting compressed air into the inlet/outlet port 49 to move the piston rod 51 in the forward direction.

Then, to open the grippers 73 an electromagnetic valve connected to the cylinder 57 is operated to admit the compressed air into the inlet/outlet port 53. Then the gripper unit reciprocating electromagnetic valve is operated to interrupt supply of the compressed air to the inlet/outlet port 49. To enable the grippers 73 to grip the ledge 14 of the ladder 13, the gripper unit reciprocating electromagnetic valve is operated to admit compressed air into the inlet/outlet port 53. After that, the gripper opening and closing electromagnetic valve is operated for admitting compressed air into the inlet/outlet port 53.

The gripper unit reciprocating electromagnetic valve and the gripper opening and closing electromagnetic valve are operated at the same time as the transfer operation of the electromagnetic valves connected to the raising and lowering cylinders.

Figure 6:
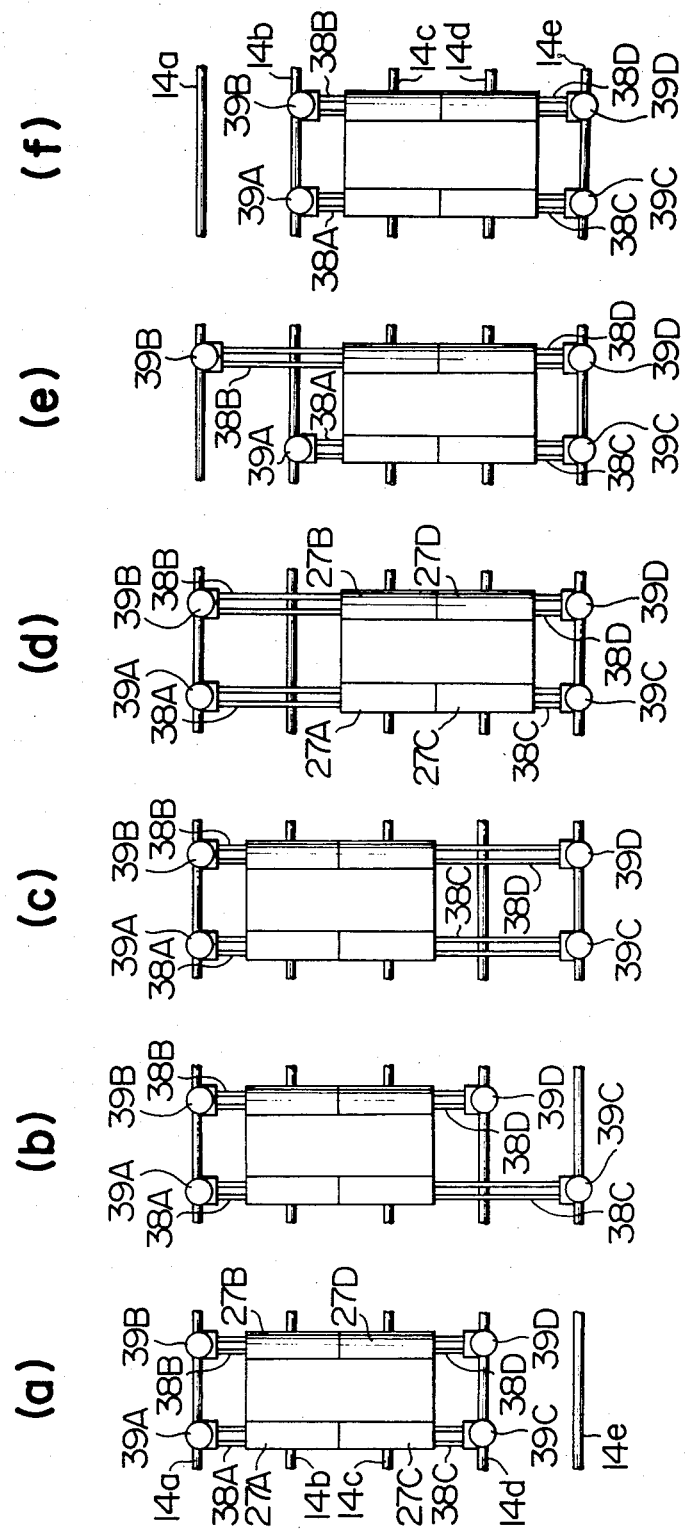
FIGS. 6a–6f are diagrammatic representations showing the manner of moving the carriage.

The apparatus for climbing up and down a ladder of this invention operates as follows:

FIGS. 6a-6f show the procedures of lowering the carriage 17 along the ladder 13. FIG. 6a shows the initial state of the carriage in which compressed air is admitted into the inlet/outlet ports 35A-35D of four raising and lowering cylinders 27A-27D to retract their piston rods 38A-38D. Furthermore, by the forces of springs 47 and 63, four gripping units 39A-39D firmly grip the ledges 14 of the ladder 13. More particularly, the gripping units 39A and 39B grip the ledge 14a, while gripper units 39C and 39D grip the ledge 14d.

At the first step, compressed air is admitted into the inlet/outlet ports 49 of 4 gripping units 39A-39D for advancing the piston rods 51 of four gripping unit reciprocating cylinders 41, whereby the gripping units 39A-39D are extended to float upwardly the carriage 17.

At the second step, compressed air is admitted into the inlet/outlet port of the gripping unit 39C to open the grippers 73 thereof. Then supply of air into the inlet/outlet port 49 of the gripper unit 39C is interrupted to move rearwardly the piston rod 51 by the force of spring 47 for retracting the gripping unit 39C. Then compressed air is supplied to the inlet/outlet port 37C of the raising and lowering cylinder 27C to move the piston rod 38C thereof in the direction of movement of the carriage. After completion of this movement, the gripper unit 39C is positioned above the ledge 14e.

After moving the raising and lowering cylinder 27C, compressed air is admitted into the inlet/outlet port 49 of the cylinder 41 of the gripper unit 39C to extend the same by moving the piston rod 51 toward the ledge 14e. Then the air is exhausted from the inlet/outlet port 53 for causing the grippers 73 to grip the ledge 14e by the force of spring 63. The state after completion of the second step is shown in FIG. 6b.

At the third step, the raising and lowering cylinder 27D and the gripper unit 39D are operated in the same manner as in step 2. The state after completion of the third step is shown in FIG. 6c.

Before commencing the fourth step, the inlet/outlet ports 35A, 35B, 37C and 37D of the raising and lowering cylinders 27A-27D are used to admit compressed air, whereas the inlet/outlet ports 35C, 35D, 37A and 37B are used to discharge the compressed air. At the fourth step, the air inlet side and the air discharge side of two inlet/outlet ports of respective raising and lowering cylinders are interchanged. In other words, the inlet/outlet ports 35C, 35D, 37A and 37B are used to admit air, while inlet/outlet ports 35A, 35B, 37C and 37D are used to discharge air. Then the piston rods of the raising and lowering cylinders 27A and 27B are protruded, whereas the piston rods of the cylinders 27C and 27D are retracted to move the carriage 17 by one pitch of the ledges. The state after completion of the fourth step is shown in FIG. 6d.

At the fifth step, compressed air is supplied into the inlet/outlet port 53 of the gripping unit 39A to open the grippers 73 thereof. Then supply of the compressed air into the inlet/outlet port 49 is interrupted to retract the piston rod 51 by the force of spring 47 for retracting the gripping unit 39A. Then compressed air is supplied to the inlet/outlet port 35A of the raising and lowering cylinder 27A to discharge air through the inlet/outlet port 37A whereby the piston rod 38A is moved in the direction of movement of the carriage 17 by one pitch of the ledges 14. Consequently, after the piston rod 38A has been moved, the gripper unit 39A would be positioned above the ledge 14b.

Then compressed air is supplied to the inlet/outlet port 49 of the gripper unit 39 to advance the piston rod 51 toward the ledge 14b of the ladder 13. Then, supply of air to the inlet/outlet port 53 is interrupted for causing the grippers 73 of the gripper unit 39A to grip the ledge 14b. The state after completion of the fifth step is shown in FIG. 6e.

At the sixth step, the raising and lowering cylinder 27B and gripper unit 37B are operated in the same manner as in the fifth step. The state after completion of the sixth step is shown in FIG. 6f. In this state, the carriage 17 is positioned at the ledge one pitch below.

By repeating several times the first to sixth steps, the carriage 17 descends several steps along the ladder 13. At the time of lowering the carriage, the air pipe winding drum pays out the air pipe bundle 23. On the other hand, where the carriage 17 is raised along the ladder 13, after the gripper units 39A-39B have been advanced at the first step, the sixth to second steps are repeatedly executed.

As above stated, since the apparatus 15 for climbing up and down can rise and lower positively with its own power, when a robot, television camera, measuring device, etc. are mounted on the carriage, maintenance and repair of machines and apparatus installed at positions in the nuclear power plant which the operator cannot see or approach can be made safely and readily.

In the illustrated embodiment, since the inlet/outlet port 53 of the cylinder 57 of the gripping unit 39 is provided at the rear end of the piston rod 51 so as to convey compressed air to the cylinder 57 via air passage 52 in the piston rod 51, the air pipe 54 does not interfere with the raising and lowering of the carriage 17 as well as the reciprocating motion of the gripper units 39A-39D, thus assuring smooth operation of the carriage and the gripper units, and preventing damage of the air pipe 54.

Furthermore the piston rods 51 and 62 of gripper reciprocating cylinders 41 and gripper opening and closing cylinders 57 of the gripper units 39A-39D are biased rearwardly by springs 47 and 63, respectively, so that it is not necessary to use air pipes for retracting the piston rods 51 and 62. For the same reason, even at the time of emergency, for example, interruption of electric power supply, the apparatus is held in a stable state wherein when the grippers 73 grip the ledges 14 of the ladder and the gripper units 39A-39D are retracted, the moment applied to grippers 73 is small so that there is no fear of disengagement or dropping off of the carriage 17.

Figure 7:
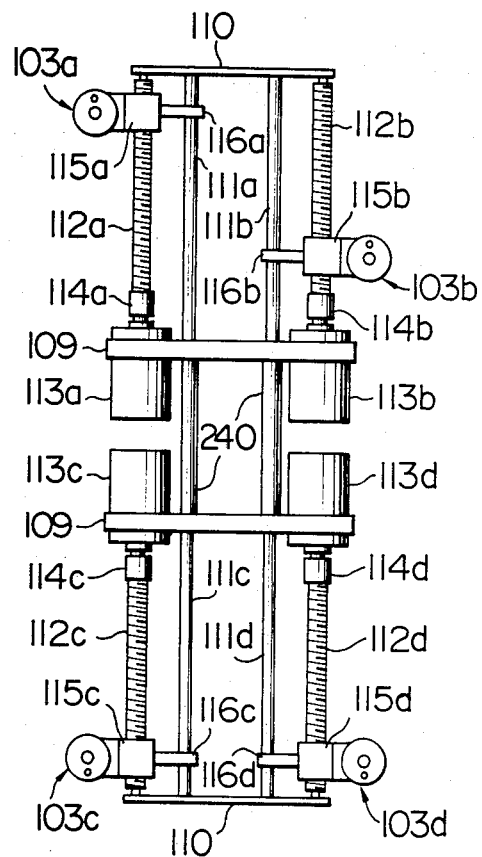
FIG. 7 is a rear view of the carriage showing a modified raising and lowering mechanism.
Figure 8:
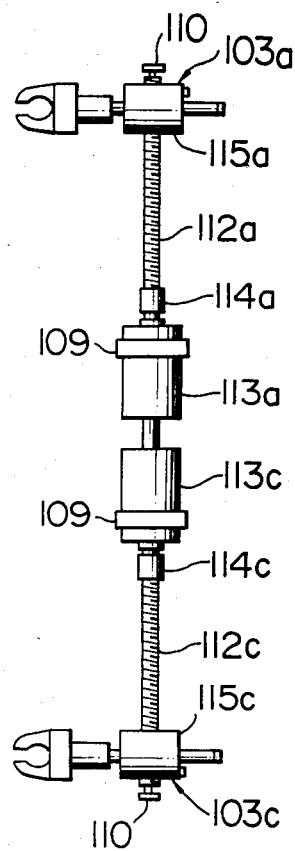
FIG. 8 is a side view of the mechanism shown in FIG. 7.

FIGS. 7 and 8 show a modified carriage raising and lowering mechanism utilizing electric motors instead of air cylinders.

More particularly, this mechanism comprises two frames 109 in the direction perpendicular to the direction of movement of the carriage 17, and supporting plates 110 at the upper and lower ends of the carriage. Between the frames 109 and supporting plates 110, upper and lower two guide rods 111a, 111b, 111c and 111d extend in the direction of raising and lowering the carriage. On the outside of the guide rods 111a-111d are rotatably provided threaded rods 112a-112d. Thus, the inner ends of the threaded rods are respectively connected to driving motors 113a-113d secured to the frames 109 respectively through couplers 114a-114d. The other ends of the threaded rods are rotatably supported by supporting plates 110 through bearings, not shown. Nuts 115a-115d are threaded on respective threaded rods and guide plates 116a-116d projecting from respective nuts engage guide rods 111a-111d, respectively. Gripping units 103a-103d are secured respectively to nuts 115a-115d. As a consequence, when motors 113a-113d are independently rotated in the forward or reverse direction to rotate threaded rods 112a-112d in the forward or reverse direction, the gripper units 103a-103d are independently raised or lowered together with nuts 115a-115d. The nuts and the gripper units can be positioned at any positions by encoders (not shown) incorporated into respective motors 113a-113d.

The construction of the gripper unit is the same as that shown in FIG. 5.

The modification shown in FIGS. 7 and 8 operates in the same manner as the first embodiment shown in FIGS. 1-6 except that electric motors are used instead of raising and lowering air cylinders, so that the operation of this modification is not described.

Instead of raising and lowering the gripper unit with air cylinders or motor driven threaded rods, pulleys and belts can be used.

In a third embodiment of this invention, motor operated threaded rods as shown in FIGS. 7 and 8 are used for raising and lowering the carriage, and gripper unit reciprocating cylinders and gripper opening and closing cylinders as shown in FIG. 4 are used.

Figure 9:
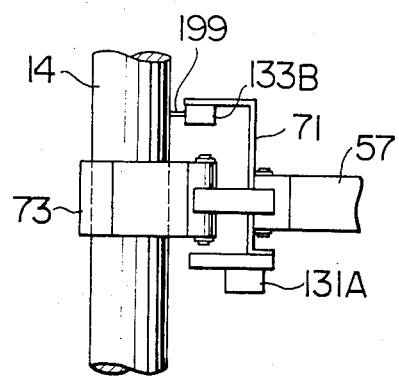
FIG. 9 is a plan view showing a modification of FIG. 5 added with a gripper position detector and a ledge position detector.

As shown in FIG. 9, ledge position detectors 131A-131D are mounted on the U-shaped cover 71. These detectors are connected to the control computer 21 and detect the positions of the ledges 14 without contacting the same. For this reason, each of the detectors is constituted by a diffusion reflection type photoelectric switch.

Furthermore, gripper position detectors, for example limit switches 133A-133D are mounted on the cover 71. Actuators 199 of these limit switches are provided in alignment with the center axes of the gripper units 39A-39D (see FIG. 6). These limit switches 133A-133D are also connected to the control computer 21 so as to detect the fact that the limit switches have approached to positions at which the grippers 73 can grip the ledges 14.

Figure 10:
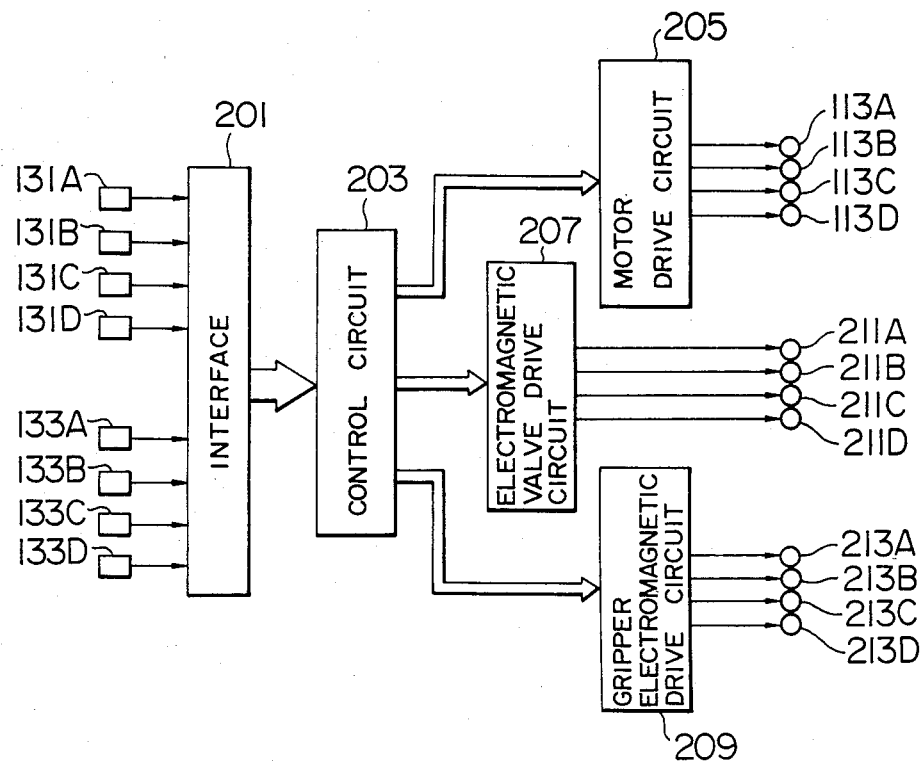
FIG. 10 is a block diagram showing a control system incorporated into the control computer shown in FIG. 1.

FIG. 10 shows a block diagram showing a control system incorporated into the control computer 21.

Signals from the ledge position detectors 131A-131D and the limit switches 133A-133D respectively provided for the gripper units 39A-39D are supplied to a control circuit 203 via an interface 201. The control circuit 203 executes calculations based on the signals from the ledge position detectors 131A-131D and the results of calculations are supplied to motors 113A-113D (see FIG. 9) via a motor drive circuit 205.

Figure 11:
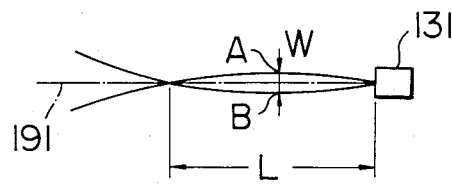
FIG. 11 shows the light receiving characteristics of a photosensitive switch utilized as a ledge position detector.

Each photoelectric switch utilized as the ledge position detector has a light receiving characteristic as shown in FIG. 11. According to this characteristic, as a ledge 14 approaches from above or below to a position within a detection distance L, the photoelectric switch 131 produces a detection signal when the ledge reaches the upper or lower edge of the projected light. For example, when the ledge is positioned at the center of the detection distance L the detection width of the projected light would become W. Then when the ledge 14 is positioned at the upper end A or lower end B of the light width W the switch 131 sends a detection signal to control circuit 203.

Consequently, it prepares a program such that after receiving a signal from a ledge position detector, one of the nuts 115a-115d is moved continuously for a definite interval, and that the nut is stopped when the center line 191 of the projected light, that is the center line of the gripper unit comes to coincide with the center of the ledge, such program being prepared by taking into consideration the moving speed of the nuts, radius of the ledges and the width W of the projected light.

Referring again to FIG. 10, when signals from limit switches 133A-133D are inputted to the control circuit 203, the control circuit 203 sends signals to electromagnetic valves 211A-211D for reciprocating gripper units via valve drive circuit 207. Further, control circuit 203 sends signals to the electromagnetic valves 213A-213D via valve drive circuit 209.

Consequently, the electromagnetic valves 211A-211D are opened to advance gripper units 29A-29D toward the ladder, and in response to the detection signals issued from limit switches 133A-133D when they engage ledges 14, the electromagnetic valves 211A-211D are closed to stop advance of the gripper units 29A-29D. At the same time, in response to the signals from the limit switches, electromagnetic valves 213A-213D are operated to close grippers 73 to grip the ledge 14.

Instead of providing photoelectric switches acting as the ledge position detectors for gripper units or movable nuts, line sensors may be mounted on a member 240 (see FIG. 7) of the carriage. The line sensors simultaneously detect the positions of a plurality of ledges so as to determine the amount of movements of the movable nuts 115a-115d. When line sensors are used encoders are incorporated into respective raising and lowering motors 113a-113d (see FIGS. 7 and 8) and the movable nuts are moved over predetermined distances by utilizing the informations from the encoders. In this case too, the gripper units 29A-29D can be positioned just in front of the ledges.

With this modification, since photoelectric switches or line sensors are provided, the carriage can be raised or lowered while confirming the positions of the ledges. Moreover, since gripper position detectors are positioned near the ledges the grippers can positively grip the ledges, thus stably moving the carriage.

In the first embodiment, air cylinders were used to raise and lower the carriage. With this construction, however, it is difficult to adjust the stroke of the carriage or gripper units. Accordingly, when the pitch of the ladder differs, or the pitch of the ledges are erroneously determined at the time of manufacturing the ladder or when the ledges are deformed during use, it becomes difficult to correctly grip the ledges with the grippers. Furthermore, use of motor operated threaded rods as in the second embodiment, increases the weight of the carriage.

The following embodiment is proposed to solve these problems.

Figure 12:
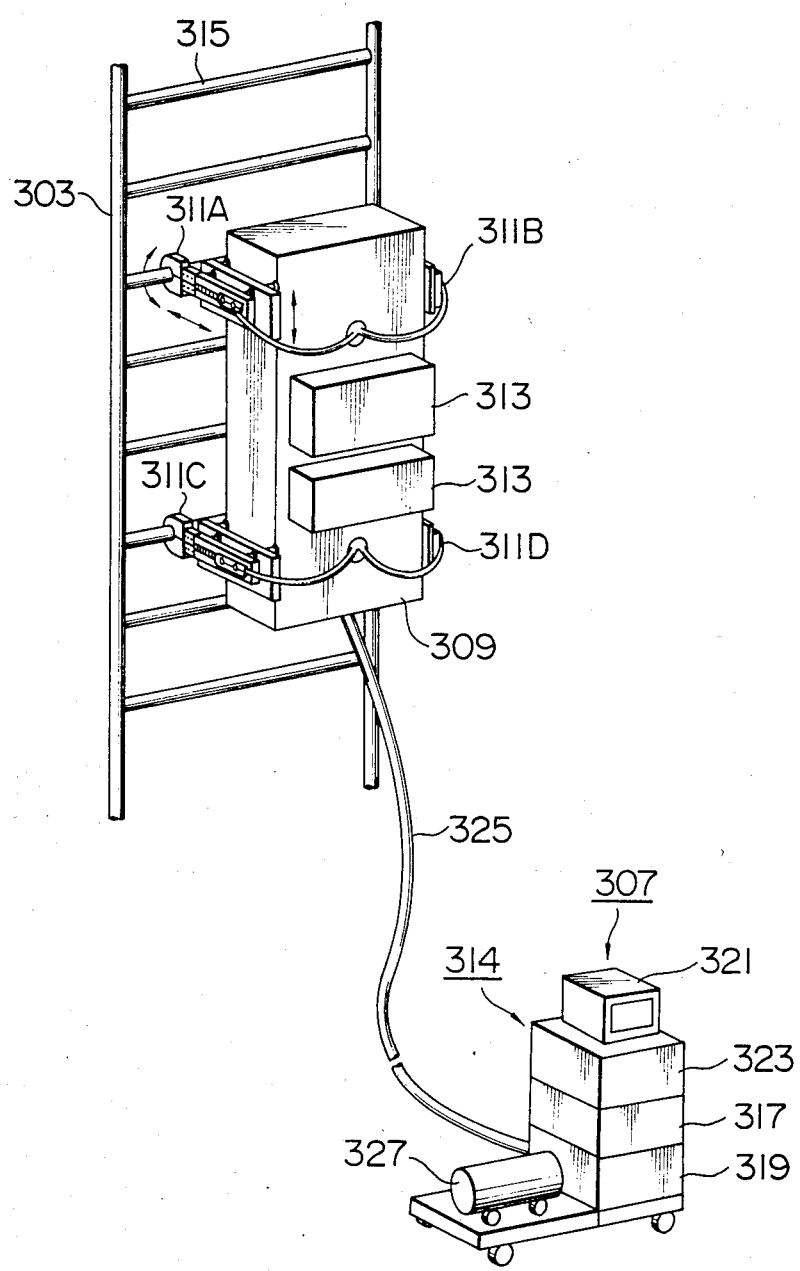
FIG. 12 is a perspective view showing modified carriage and a stationary unit.

FIG. 12 shows a modified carriage 309 and a stationary control unit 307. The carriage 309 is provided with four gripper units 311A-311D near its corners and control devices 313 which determine the directions of movements of the carriage. The grippers are driven by electric motors and air cylinders.

The stationary control unit 307 comprises a control device 314 including an electric source 317 and an air compressor 319 which are used for driving the gripper units, a monitor 321 and an operating box. Electric cables from the source 317, air tubes from the compressor, signal cables from the monitor 321 and the operating box 323 are connected to corresponding elements on the carriage through a bundle 325 of cables and air pipes which are wound about a winding drum 327.

The control devices 313 on the carriage 309 not only control the operations of the four gripper units but also control the operation of the winding drum 327.

Gripper raising and lowering mechanisms 333A-333D are provided for respective gripping units 311A-311D and respectively comprise gripper unit raising and lowering electric motors 335A-335D, worm gears 337A-337D and timing belts 339A-339D. Motors 335A and 335B are mounted on the lower half of the carriage 309, while motors 335C and 335D are on the upper half. Shafts of the motors 335A-335D are connected to drive shafts 341A-341D through worm gears 337A-337D. Drive pulleys 343A-343D are respectively mounted on drive shafts 341A-341D.

Driven shafts 345A-345D are mounted on the upper and lower ends of a frame 329 corresponding to drive shafts 341A-341D. Respective driven shafts carry pulleys 347A-347D and the timing belts 339A-339D are passed around pulleys 347A-347D and pulleys 343A-343D. Gripper units 311A-311D are secured to timing belts 339A-339D through fastenings 357A-357D.

Consequently, when motors 335A-335D are independently operated the timing belts 339A-339D are moved in the vertical direction through worm gears 337A-337D so as to move gripper units in the vertical direction. By suitably energizing and deenergizing motors 335A-335D, gripper units 311A-311D can be stopped at any desired positions. Moreover, worm gears mechanically lock the stopped positions of the gripper units 311A-311D.

Rails 349 are mounted on both sides of the back surface of the frame 329 and rollers 359A-359D for raising and lowering the gripper units 311A-311D are fitted to the rails. Limit switches 348A-348D are mounted on the upper and lower ends of the frame 329.

Since gripper units 311A-311D have the same construction, only unit 311C will be described in detail with reference to FIGS. 15 and 16.

The gripper unit 311C is constituted by an elevation table 351C, a slide base 353C provided for the table 351C and grippers 355C pivotably supported by the slide base 353C.

Figure 16:
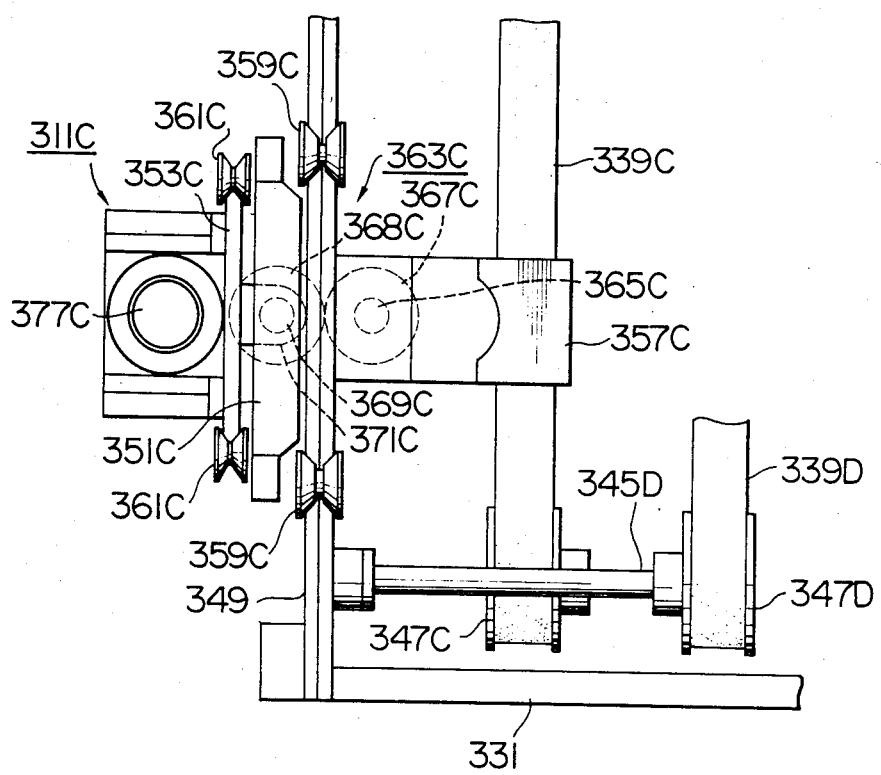
FIG. 16 is a side view of the gripper unit shown in FIG. 15.

As shown in FIG. 16, a mounting plate 357C secured to the timing belt 339C is secured to the rear surface of the elevating table 351C so as to move the gripper unit 311C in the vertical direction via timing belt 339C. A plurality of rollers 359C are provided for the rear surface of the elevating table 351C on the opposite ends thereof. These rollers 359C fit in the rails 349 of the frame 329 for guiding the vertical movement of the gripper unit 311C.

Figure 15:
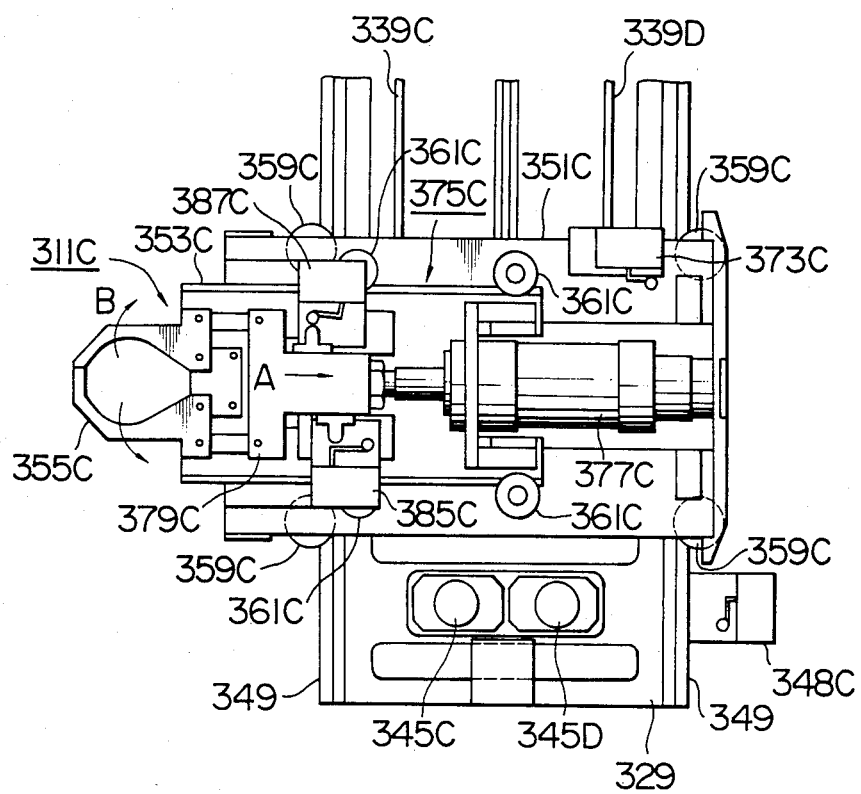
FIG. 15 is an enlarged side view showing the detail of one gripper unit utilized in the modified embodiment shown in FIG. 12.

Further, as shown in FIG. 15, slide bases 353C are formed on the front end of the elevating table 351C and a plurality of rollers 361C are provided. The upper and lower sides of the slide base 353C are guided by the rollers 361C to be movable in the direction of height of the carriage, that is toward and away from the ladder 13.

As shown in FIG. 16, the elevation table 351C is provided with a gripper unit reciprocating mechanism 363C permitting the slide base 353C to reciprocate. The gripper unit reciprocating mechanism 363C comprises an electric motor 365C, meshing gears 367C and 368C, a threaded rod 369C and a nut 371C. The motor 365C is supported by a support 357C which also supports the gear 367C. The nut 371C is secured to the rear surface of the slide base 353C for mating with threaded rod 369C which is integral with gear 368C.

Accordingly when motor 365C is energized the slide base 353C is moved toward and away from the ladder 13 through gears 367C, 368C, threaded rod 369C and nut 371C. The slide base 353C is stopped at any position by the start and stop of the motor 365C.

As shown in FIG. 15, a limit switch 373C is mounted on the elevating table 351C for detecting the maximum stroke of the slide base 353C away from the ledge 315 of the ladder 303.

The slide base 353C is provided with a pair of grippers 355C and a gripper opening and closing mechanism 375C. This mechanism comprises an air cylinder 377C which is operated in the same manner as the cylinder 57 shown in FIG. 5 to open and close grippers 355C.

Further, the slide base 353C is provided with a limit switch 385C for gripper opening and a limit switch 387C for gripper closing.

In the same manner as in FIG. 9, a photosensor (not shown) is provided to detect the ledges. When the photosensor detects a ledge the gripper unit raising and lowering motor 335C is stopped with the center of the gripper unit 311C aligned with the axis of the ledge 315.

Also in the same manner as in FIG. 9, a limit switch (not shown) is provided for the front end of the slide base 353C to be acted by a lever secured to a ledge (see FIG. 9, 133B and 199).

Each control device 313 includes a central processing unit and a plurality of interfaces which in response to the outputs of limit switches control raising and lowering of the carriage, reciprocation of gripper units and opening and closing of grippers generally in the same manner as the control circuit shown in FIG. 10.

Since in the last embodiment gripper units are secured to motor driven belts it is possible to make small and light weight the gripper unit raising and lowering mechanism. Consequently, the carriage can carry a heavy weight robot, television camera, etc.

What is claimed is:

1. Apparatus for moving along a structure having ledges comprising:
    a carriage;
    a plurality of gripper units operatively associated with said carriage, each one of said gripper units including grippers for gripping a ledge of said structure;
    drive means for moving said carriage along said structure in one or another direction;
    reciprocating means carried by said carriage for reciprocatingly extending said gripper units toward and away from said ledges;
    motive means operatively associated with said gripper units for opening and closing said grippers for causing the same to grip and release said ledges;
    detecting means operatively connected to said carriage for detecting positions of said ledges; and
    means cooperating with said gripper units and said detecting means for halting extension of said gripper units toward said ledges when said gripper units are sufficiently close to grip one of said ledges.

2. The apparatus according to claim 1 wherein said motive means for opening and closing said grippers comprises fluid pressure piston cylinder means.

3. The apparatus according to claim 1 wherein said means for reciprocating said gripper units comprises electric motors.

4. The apparatus according to claim 1 which further comprises a control means including a computer for controlling said drive means, said means for reciprocating said gripper units said motive means for opening and closing said grippers, and said halting means.

5. The apparatus according to claim 1 wherein said means for reciprocating said gripper units comprises fluid pressure piston cylinder means.

6. The apparatus according to claim 1 wherein said detecting means comprises a photoelectric switch.

7. The apparatus according to claim 1 wherein said means for moving said carriage comprises a plurality of electric motors carried by said carriage, threaded rods extending in the direction of movement of said carriage and respectively driven by said electric motors and nuts respectively mating with said threaded rods, each nut supporting said gripper unit.

8. The apparatus according to claim 1 which further comprises a control means including an electric source and a source of compressed air, and air pipes and an electric cable for supplying compressed air and electric power to said drive means for moving said carriage, said gripper unit reciprocating means and said motive means for opening and closing said grippers.

9. The apparatus according to claim 1 wherein said drive means for moving said carriage comprises a plurality of fluid pressure piston cylinder means each including at least one piston rod and wherein each one of said gripper units is supported by said piston rods.

10. The apparatus according to claim 9 wherein said piston rod comprises a plurality of parallel juxtaposed piston rods.

11. The apparatus according to claim 1 which further comprises control means including a computer for controlling said reciprocating means, said motive means, and said halting means.

12. The apparatus according to claim 11 which further comprises means for supplying outputs of said detecting means to said computer for controlling said means for reciprocating said gripper units, said motive means for opening and closing said grippers and said halting means.

13. The apparatus according to claim 1, wherein said halting means comprises a limit switch means mounted on one of said gripper units for providing a signal to said reciprocating means upon contact with said ledges.

14. The apparatus according to claim 13, wherein each gripper unit is provided with a limit switch means.

* * * * *